No. 744,008. PATENTED NOV. 10, 1903.
J. PROEGER.
APPARATUS FOR MAKING HOLLOW GLASS ARTICLES.
APPLICATION FILED APR. 3, 1899.
NO MODEL. 2 SHEETS—SHEET 1.

No. 744,008. PATENTED NOV. 10, 1903.
J. PROEGER.
APPARATUS FOR MAKING HOLLOW GLASS ARTICLES.
APPLICATION FILED APR. 3, 1899.
NO MODEL. 2 SHEETS—SHEET 2.

WITNESSES
INVENTOR

No. 744,008. Patented November 10, 1903.

UNITED STATES PATENT OFFICE.

JULIUS PROEGER, OF GREENSBURG, PENNSYLVANIA, ASSIGNOR TO TOLEDO GLASS COMPANY, OF TOLEDO, OHIO, A CORPORATION OF OHIO.

APPARATUS FOR MAKING HOLLOW GLASS ARTICLES.

SPECIFICATION forming part of Letters Patent No. 744,008, dated November 10, 1903.

Application filed April 3, 1899. Serial No. 711,475. (No model.)

*To all whom it may concern:*

Be it known that I, JULIUS PROEGER, of Greensburg, in the county of Westmoreland and State of Pennsylvania, have invented a new and useful Improvement in Apparatus for Making Hollow Glass Articles, of which the following is a full, clear, and exact description, reference being had to the accompanying drawings, forming part of this specification, in which—

Figure 1:
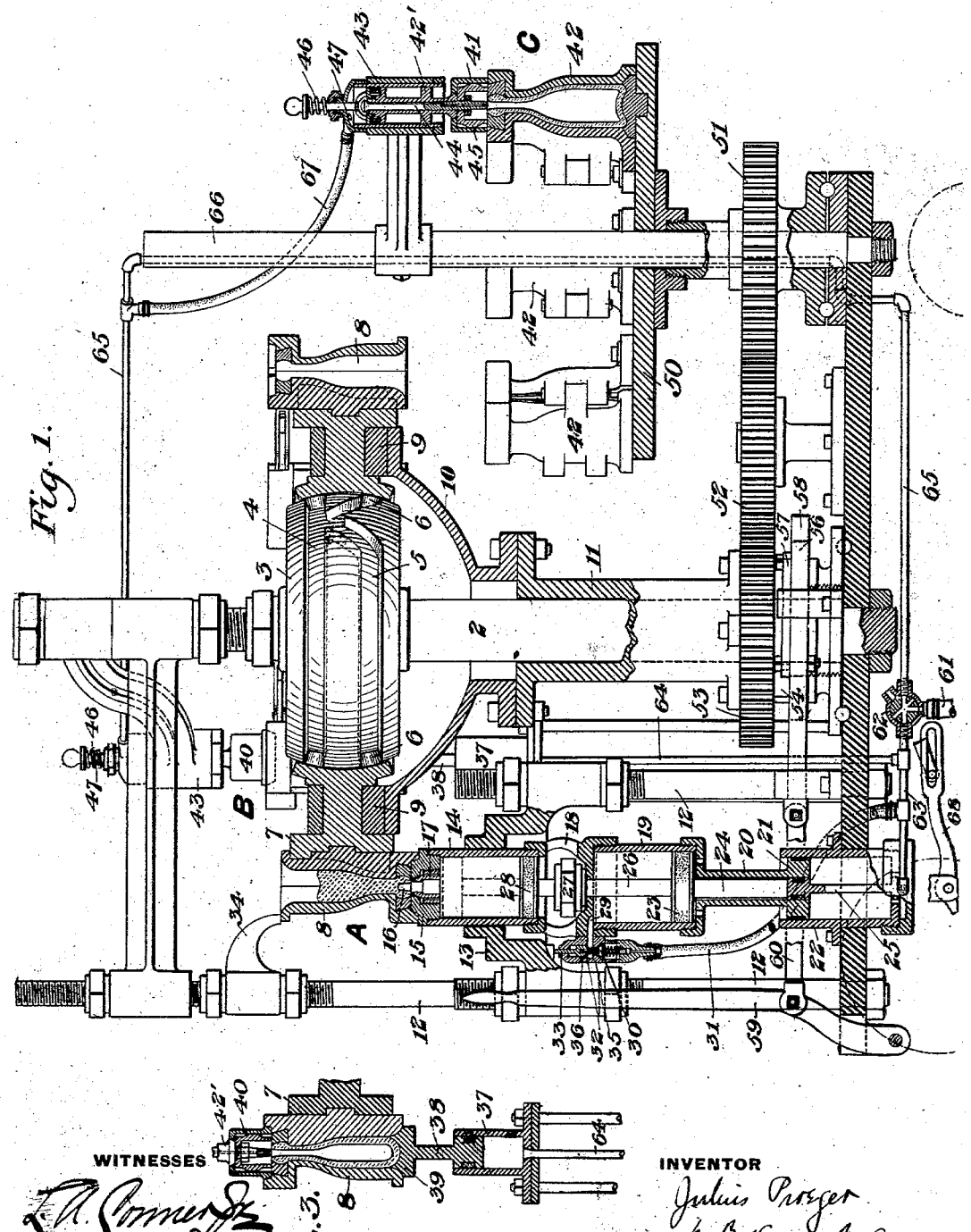
Figure 2:
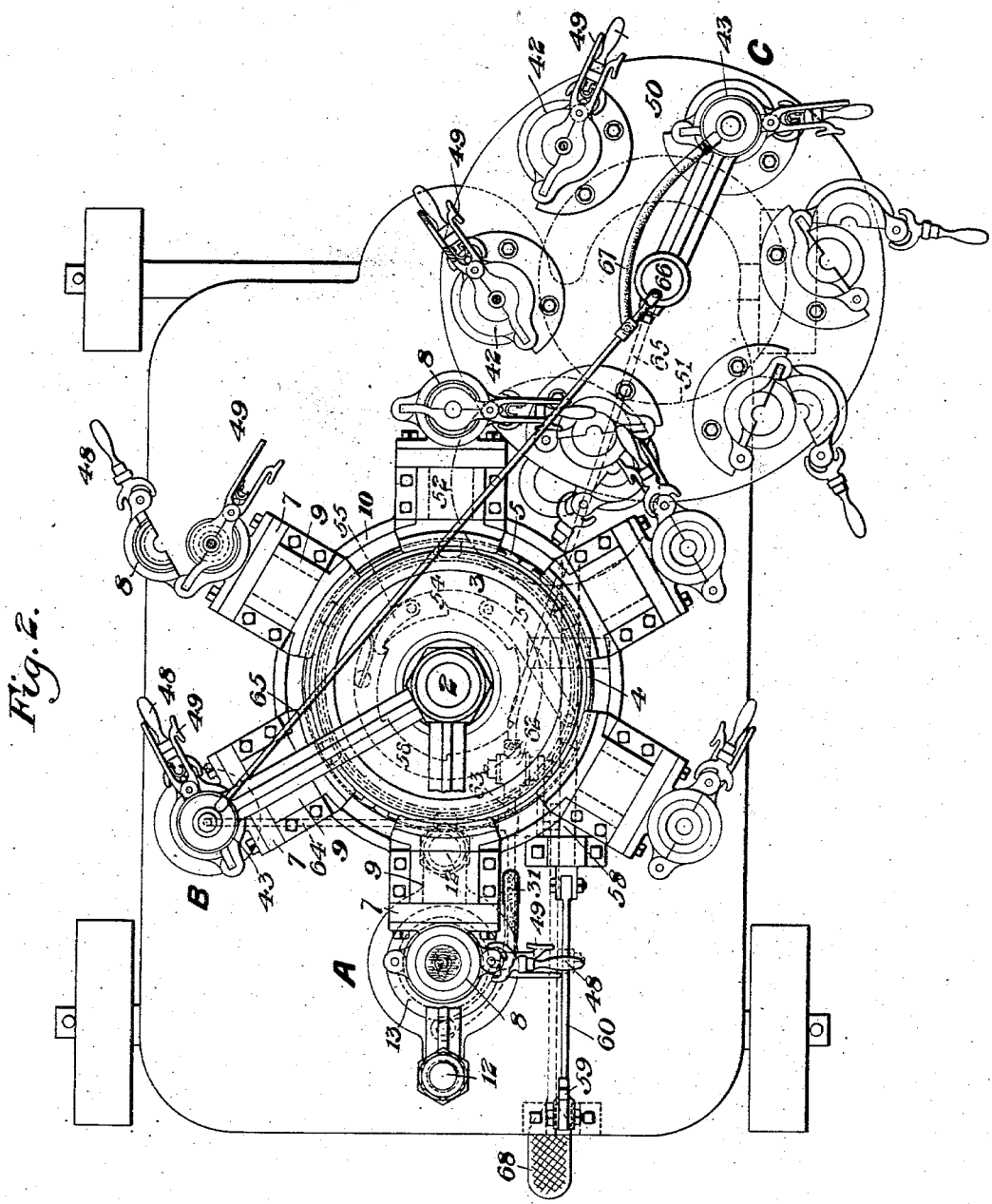

Figure 1 is a sectional side elevation of my improved machine, partly broken away. Fig. 2 is a top plan view of the same, and Fig. 3 is a detail vertical section showing the blank-blowing mechanism.

My invention relates to the formation of hollow glass articles by shaping and then blowing; and its object is to provide an improved apparatus for forming such articles whereby all danger of collapsing of the walls of the blank after shaping or pressing is prevented, and a simple and effective means for obtaining such articles is provided.

Heretofore in forming articles by pressing and then blowing the walls of the pressed hollow article would collapse and weld to each other before blowing, so as to prevent the proper formation of the article. I have entirely overcome this difficulty by shaping only one end of the article in the first step, leaving the body of the article solid, and then admitting air to a small indentation in the finished end, so as to blow the article into shape.

In the drawings, in which I show my preferred form of machine, 2 represents a vertical standard carrying a section 3 of a sphere having cam-grooves 4 and 5, with which engage rollers 6, projecting inwardly from rotatory holders 7. These holders are provided at their inner ends with curved plates which fit upon the curved surface of the stationary guide block or section 3, and to their outer ends are secured the divided blank-molds 8. The intermediate stems of the holders are mounted in bearings 9 upon a ring 10, which is bolted to the rotating hollow shaft 11, surrounding the standard 2. I have shown six blank-molds as provided; but it is evident that any desired number may be used.

There are two working stations for this portion of the machine, A being the shaping-station and B the blank-blowing station. At the station A are provided vertical standards 12, between which is carried a guide 13 for a hollow cylinder 14, having at its upper end a head 15, adapted to fit neatly within the recess-head of the mold. The head 15 is provided with a central pin 16, which enters the mouth of the glass article, which I have shown, as for a bottle, and around the pin are a series of suction-ports 17, which lead from inside the cylinder to the head of the opening in the mold when the head is forced up against the mold. The cylinder 14 is carried upon arms or brackets 18, secured to a lower cylinder 19, the lower head of which is secured to the hollow piston-rod 20 of a piston 21 within a cylinder 22. The three cylinders 14, 19, and 22 are arranged in tandem, one above the other, and a piston 23 in cylinder 19 is provided with a downwardly-depending stem 24 within the hollow rod 20, the lower end of the stem 24 resting upon the upper packed end of a central post 25, which extends upwardly from the center of the lower head of cylinder 22. An upwardly-projecting rod or stem 26 on the piston 23 passes through a stuffing-box 27 and is secured to piston 28 within the cylinder 14. The head 15 is forced into position against the end of the mold by admitting fluid into the lower end of cylinder 22, and to produce the exhaustion of the air within the upper cylinder 14 the fluid under pressure is admitted into the upper end of cylinder 19 through port 29, controlled by valve 30. The valve 30 is provided with a depending angular stem guided within a hole in the lower head of the valve-casing and to which leads the fluid-supply pipe 31, consisting of a flexible hose. The valve is also provided with an upwardly-extending angular stem, which is guided in a plunger-head 32, having a stem 33. In the casing 35 for the plunger-head 32 is provided an exhaust-port 36. The stems of the valve are surrounded by spiral springs, so that there may be a slight movement of the plunger-head 32 without moving the valve. The frame is provided with a leveling-finger 34 to contact with the molds at station A.

The action of this part of the apparatus is as follows: Fluid under pressure being supplied to the lower end of cylinder 22 and to the hose 31, the cylinders 14 and 19 will be forced upwardly until the head 15 is received in the recess of the mold. As the head enters the mold the stem 33 will contact with the stationary part of the frame and the plunger-head 32, striking the top of the upper stem of the valve, will force the valve down. The fluid entering the upper end of the cylinder 19 will force down the piston 23, which will draw down the piston in the upper cylinder 14, and thus suck down the glass within the mold-cavity and finish the mouth of the bottle within the detachable head-clamp or mold-ring. The compressed fluid then being exhausted by turning valve 62, as hereinafter described, the upper cylinders will descend with the lower piston 21, and as the plunger-head 32 is released it will be forced up, opening the exhaust from cylinder 19, so that as the parts are lowered the piston 28 will be brought into the upper end of the cylinder 14. At the next station B, I blow the blank, and between the stations A and B the cam-grooves upon the block 3 are arranged, as shown, at the right-hand portion of Fig. 1, so that the holder will be rotated to reverse the position of the mold and bring the finished mouth end to the top. At this station is provided a lower stationary cylinder 37, containing plunger 38, having a forming-head 39, which enters the open lower end of the mold and forms the base of the blank blown against it. The blowing is effected by a hollow head 40, which is constructed and supported the same as the head 41 for the blow-mold proper, 42. In each case this head is carried upon the projecting hollow stem of a plunger 42', movable in a stationary cylinder 43, the stem containing a headed rod or pin 44 with a port leading along one side and thence through its lower portion. This stem extends down within the hollow head 41, and to it within the head is secured a collar or ring 45, having a bulb-shaped outer face, so that it may adjust itself within the head and seat flatly on the top of the mold-ring. This collar 45 normally projects slightly below the head 41, so that as the head is forced down into contact with the mold the ring will be lifted, and thus move up the headed end of the rod and allow the fluid under pressure to pass down through the rod into the mold. The cylinder is single-acting, and the plunger is lifted by a spring 46 surrounding a stem 47, secured to the upper end of the plunger. The blank thus being blown into hollow form at station B is moved to the next station, at which the mold is opened by the handle 48, and the upper mold-ring is pulled out by its handles 49. This ring, with the blown blank depending therefrom, is then inserted in one of the finish blow-molds 42, six of which are mounted upon the rotary platform 50. This finishing-mold is then closed, and as it in its turn is brought to the blowing-station C the bottle is blown into final shape. The platform 50 is secured to a toothed wheel 51, intermeshing with a wheel 52, which on the other side engages toothed wheel 53, secured to the hollow shaft 11. The wheel 53 is rotated intermittently by a ratchet-wheel 54 secured to its hub and engaged by a spring-pressed pawl 55, carried on loose rings 56, connected by loose link 57 with a slide 58. The slide is operated by the hand-lever 59, connected thereto by link 60, and is operated intermittently, so as to move each of the carriers one-sixth of a revolution at each stroke. The compressed fluid is led through a main 61 to a valve 62, from which leads a pipe 63 to the lower end of cylinder 22, the hose connection 31 leading from this pipe. A branch 64 also leads from this pipe to the lower end of cylinder 37, and from the other side of the valve a pipe 65 leads upwardly through the vertical standard 66 and thence over to the upper end of the cylinder for the blank-blowing station. A flexible connection 67 leads from pipe 65 to the cylinder for the finish blowing-station C. The valve 62 is operated by a foot-lever 68, and is so arranged that when the foot-lever is released fluid will be exhausted through all the pipes leading thereto.

The operation of my improved machine is obvious from the above description. A blank is being finish-blown at the same time that another blank is being blown into hollow form at station B, and the mouth end of another is being shaped at station A, where a hole is made in the mouth by the projecting pin. The operator after dropping the hot glass into the open end of the mold at station A depresses the foot-lever, and thus sucks the glass down, so as to form the head. At the same time the air will blow the other two blanks at stations B and C. The operator then releasing the foot-lever moves the carriers by the hand-lever and at each such movement another operator opens the press-mold beyond the station B, and removing the mold-ring and blank places them in one of the finish-molds upon the platform 50. The finished articles are removed after passing station C, and the mold-rings again inserted in the press-molds, which are closed and again brought into inverted position before reaching the station A.

The advantages of my invention result from the shaping of one end of the blank and leaving the body of the blank solid before blowing, as this prevents any collapsing of the walls of a pressed hollow blank when reversing it. The blowing of this blank into a hollow glass blank prepares it for the finish-blowing and insures uniform thickness and good articles.

The apparatus is largely automatic and is capable of a large output.

Many changes may be made in the apparatus used without departing from my invention.

I claim—

1. In apparatus for forming hollow glass articles, a mold, apparatus for sucking glass into the mold, means for indenting one end of said body, and a separate mold arranged to expand the blank into hollow form; substantially as described.

2. In apparatus for forming hollow glass articles, a mold, apparatus for sucking glass thereinto, an indentor arranged to form a small recess in one end of the article, mechanism for blowing the glass into a hollow blank, and a finish blow-mold arranged to shape the blank into finished form; substantially as described.

3. In apparatus for forming hollow glass articles, a mold, apparatus for sucking the glass downwardly within said mold and for indenting one end of the blank, and mechanism for inverting the mold, and blowing the glass into a hollow blank; substantially as described.

4. In apparatus for forming hollow glass articles, a mold, for forming one end of the same, an apparatus for sucking glass thereinto, an indentor arranged to form a recess in said end, mechanisms for inverting the mold and blowing the glass into a hollow blank, and a blow-mold arranged to finish the hollow blank into the article; substantially as described.

5. In apparatus for forming hollow glass articles, a blank-mold, mechanism for shaping by sucking one end of a blank with an indentation, mechanism for blowing the body of glass into a hollow blank in said mold, and a finish blow-mold arranged to receive the hollow blank; substantially as described.

6. A blank-mold, means for shaping by suction one end of the blank, mechanism for reversing the mold, mechanism for blowing the partially-shaped blank to a hollow blank therein, and a finish blow-mold arranged to receive the hollow blank; substantially as described.

7. A carrier having blank-blowing molds thereon, suction mechanism for shaping the end of an article at one station, mechanism arranged to reverse the mold after the shaping, and mechanism for admitting air to blow a hollow blank in the reversed mold; substantially as described.

8. A carrier having a series of blank-blowing molds, a sucking device arranged to draw glass into one end of the mold and form an indentation therein, reversing mechanism for the mold, and a blowing device arranged to blow the glass into a hollow blank; substantially as described.

9. A carrier having a series of blank-blowing molds, mechanism at one station for sucking the glass into one end of the mold, and blowing mechanism at the next station arranged to blow the glass into a hollow blank; substantially as described.

10. Mechanism for forming hollow glass articles, comprising a carrier having blank-blowing molds, mechanism at one station for sucking the glass into one end of the mold, and indenting it, mechanism to reverse the mold, and blowing mechanism arranged to form the glass into a hollow blank; substantially as described.

11. In apparatus for forming hollow glass articles, a sucking mechanism arranged to draw glass into one end of the mold-cavity, a blank-blowing mechanism, and a single lever arranged to control both mechanisms; substantially as described.

12. A carrier having blank-molds with removable clamps or rings, sucking mechanism arranged to form one end of an article within the ring, blowing mechanism at another station arranged to blow the body of the blank into a hollow blank, and a finish blow-mold arranged to receive the mold-ring with the hollow blank; substantially as described.

13. A carrier having a series of blow-molds, another carrier having finish blow-molds, mechanism at one station of the first carrier to form one end of the article, reversing mechanism for the molds, a blowing mechanism arranged to blow the glass into a hollow blank, and mechanism for finish-blowing at a station of the second carrier; substantially as described.

In testimony whereof I have hereunto set my hand.

JULIUS PROEGER.

Witnesses:
   F. E. GAITHER,
   G. B. BLEMMING.